(12) United States Patent
Van Der Stap et al.

(10) Patent No.: US 9,505,294 B2
(45) Date of Patent: Nov. 29, 2016

(54) WEATHER STRIP, WEATHER STRIP JOINING DIE SET, AND WEATHER STRIP MANUFACTURING METHOD

(71) Applicant: TOYODA GOSEI CO., LTD., Kiyosu-shi, Aichi-ken (JP)

(72) Inventors: Jorn Van Der Stap, Sherbrooke (CA); Andrè Lavalière, Sherbrooke (CA)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/561,296

(22) Filed: Dec. 5, 2014

(65) Prior Publication Data

US 2016/0159210 A1    Jun. 9, 2016

(51) Int. Cl.
| | |
|---|---|
| *E06B 7/16* | (2006.01) |
| *B60J 10/08* | (2006.01) |
| *B60J 10/00* | (2016.01) |
| *B29C 65/18* | (2006.01) |
| *B29C 65/48* | (2006.01) |
| *B29C 65/50* | (2006.01) |
| *B29C 65/74* | (2006.01) |
| *B29C 65/78* | (2006.01) |
| *B29C 65/00* | (2006.01) |
| *B29L 31/26* | (2006.01) |

(52) U.S. Cl.
CPC ............... *B60J 10/08* (2013.01); *B29C 65/18* (2013.01); *B29C 65/4815* (2013.01); *B29C 65/5057* (2013.01); *B29C 65/7441* (2013.01); *B29C 65/7841* (2013.01); *B29C 66/1142* (2013.01); *B29C 66/326* (2013.01); *B29C 66/5241* (2013.01); *B29C 66/52431* (2013.01); *B29C 66/63* (2013.01); *B29C 66/83221* (2013.01); *B60J 10/00* (2013.01); *B60J 10/0017* (2013.01); *B60J 10/0022* (2013.01); *B60J 10/0054* (2013.01); *B60J 10/0068* (2013.01); *B60J 10/0077* (2013.01); *B29C 65/483* (2013.01); *B29C 66/81417* (2013.01); *B29C 66/81423* (2013.01); *B29C 66/81427* (2013.01); *B29L 2031/26* (2013.01)

(58) Field of Classification Search
CPC .. B60J 10/08; B60J 10/0054; B60J 10/0077; B60J 10/0068; B60J 10/0017; B60J 10/0022; B29C 65/42; B29K 2105/256
USPC ............................................. 49/479.1, 490.1
See application file for complete search history.

(56) References Cited

U.S. PATENT DOCUMENTS

| | | | | |
|---|---|---|---|---|
| 4,946,525 A | * | 8/1990 | Aupic et al. ................ | 156/134 |
| 5,348,604 A | * | 9/1994 | Neff .......................... | 156/272.8 |

(Continued)

FOREIGN PATENT DOCUMENTS

| | | | |
|---|---|---|---|
| EP | 0 000 643 | * | 7/1978 |
| EP | 0 680 817 A1 | * | 3/1995 |
| JP | 2001-171441 A | | 6/2001 |

*Primary Examiner* — Jerry Redman
(74) *Attorney, Agent, or Firm* — Posz Law Group, PLC

(57) ABSTRACT

A weather strip is formed by joining a first sealing body, a second sealing body, and a resin joint portion, which is arranged between the sealing bodies, to each other. The resin joint portion includes a rib portion, which has a shape that bulges outward from between the opposed faces of the first sealing body and the second sealing body. The rib portion has a shape to be joined to the outer surface of the end of the first sealing body and the outer surface of the end of the second sealing body and to extend along the joined parts of the first sealing body and the second sealing body.

7 Claims, 5 Drawing Sheets

(56) References Cited

U.S. PATENT DOCUMENTS

| | | | |
|---|---|---|---|
| 5,679,205 A * | 10/1997 | Marks et al. | 156/406.6 |
| 2008/0035708 A1 * | 2/2008 | Veille et al. | 228/160 |
| 2008/0096003 A1 * | 4/2008 | Dragon et al. | 428/313.5 |
| 2011/0078959 A1 * | 4/2011 | Nozaki | 49/489.1 |
| 2011/0099912 A1 * | 5/2011 | Ohtake et al. | 49/502 |
| 2015/0089878 A1 * | 4/2015 | Otsuka et al. | 49/440 |
| 2015/0183309 A1 * | 7/2015 | Koshimichi | 49/440 |

* cited by examiner

WEATHER STRIP, WEATHER STRIP JOINING DIE SET, AND WEATHER STRIP MANUFACTURING METHOD

BACKGROUND OF THE INVENTION

The present invention relates to a weather strip formed by joining two sealing bodies, a weather strip joining die set for forming the weather strip, and a method for manufacturing the weather strip.

Typically, weather strips are attached to the openings of the doors and the trunk of automobiles. When an opening is closed with a door or a trunk lid, the weather strip seals the clearance between the door or the trunk lid and the opening to restrict intrusion of rain water and wind into the interior.

A weather strip includes a first sealing body, which extends linearly or along an arc of a large radius of curvature, and a second sealing body, which is at a part where the extending direction changes sharply, such as a corner. The first sealing body is formed by extrusion, and the second sealing body is formed by molding. The weather strip is formed by joining these sealing bodies. Some other types of weather strips are formed by joining extruded sealing bodies.

Conventionally, the splicing has been known as a method for joining two or more sealing bodies to each other (for example, Japanese Laid-Open Patent Publication No. 2001-171441). Specifically, two sealing bodies are each fixed to a die. Then, a joining sheet, which is made of a resin material such as a synthetic rubber or a thermoplastic resin, is held between the dies, that is, between the opposed end faces of the two sealing bodies. In this state, the end faces of the sealing bodies and the surrounding parts are heated. This melts the joining sheet, so that the sealing bodies are joined to form an integral body. The excess of the molten joining sheet is cut off and removed by the two dies when the dies are abutted against each other.

A weather strip with a joined part receives a concentrated stress at the joined part when the weather strip is bent. Thus, in such a weather strip, cracks may start forming in the joined part.

SUMMARY OF THE INVENTION

Accordingly, it is an objective of the present invention to provide a weather strip that suppresses formation of cracks at a joined part in a favorable manner, a die suitable for forming the weather strip, and a method for manufacturing the weather strip.

To achieve the foregoing objective, a weather strip is provided that includes a first sealing body, a second sealing body, and a joint portion that is located between the first and second sealing bodies and made of a resin material for joining the first and second sealing bodies with each other. The joint portion includes a rib portion. The rib portion bulges outward from between the first sealing body and the second sealing body. The rib portion is joined to an outer surface of an end of the first sealing body and to an outer surface of an end of the second sealing body.

The rib portion of the above weather strip, which is integrated with the joint portion, is joined to the outer surface of the first sealing body and the outer surface of the second sealing body. Thus, compared to a weather strip without a rib portion, the area of joint between the sealing bodies and the joint portion is increased by the amount corresponding to the joined part between the outer surface of the first sealing body and the rib portion and the joined part between the outer surface of the second sealing body and the rib portion.

Further, in the above described weather strip, the joined part between the first sealing body and rib portion and the joined part between the second sealing body and the rib portion extend along the outer surface of the first sealing body and the outer surface of the second sealing body. Therefore, when the weather strip is bent such that a portion on one side of the axis of the weather strip is expanded and the portion on the other side is compressed, the expanded portion is allowed to be expanded in a direction along the joined part. At bending of the weather strip, if the expanded portion is expanded in a direction perpendicular to the joined parts, most of the bending stress acts to tear the joined parts. In contrast, in the case of the above described weather strip, since the portion that is expanded at bending is expanded in a direction along the joined parts, the part of the bending stress that acts to tear the joined parts is reduced. Therefore, the weather strip has a structure that is unlikely to form cracks due to bending stress.

Thus, the above described weather strip is capable of suppressing formation of cracks at the joined parts of the first sealing body and the second sealing body in a favorable manner.

In the above described the weather strip, a thickness of the rib portion in a direction of bulging preferably decreases as a distance from the joint portion increases.

The above described weather strip allows the ends of the rib portion to be easily expanded or compressed when the weather strip is bent. This reduces the stress acting on the joined part between the rib portion and the first sealing body and the stress acting on the joined part between the rib portion and the second sealing body, so that formation of cracks at these joined parts is suppressed in a favorable manner.

The weather strip is preferably arranged between an opening of a vehicle body and a lid member that is attached to the vehicle body to selectively open and closes the opening. The weather strip preferably includes a fixing portion to be fixed to the vehicle body and a sealing portion, which seals a clearance between the lid member and the vehicle body when the lid member closes the opening, and the rib portion is preferably provided on the fixing portion.

In the above described weather strip, the rib portion provided on the fixing portion suppresses formation of cracks in the joined parts. Further, since the rib portion is not formed in the sealing portion, the sealing performance of the sealing portion is not lowered by the rib portion.

The above described weather strip preferably includes a plate-like sealing lip portion, which has a tip end contacting the vehicle body. The rib portion is preferably located at a position surrounded by the vehicle body, the fixing portion, and the sealing lip portion.

The rib portion of the above described weather strip is located at a position that cannot be seen by the occupants of the vehicle, the rib portion therefore does not degrade the appearance of the weather strip.

In the above described weather strip, each of the first sealing body and the second sealing body preferably has in it a core member that extends in an extending direction.

In the above described weather strip, the first sealing body and the second sealing body each have a core member and therefore resist bending. However, the joint portion, at which no core member exists, is easily bent. Therefore, it can be said that the above described weather strip has a structure in which, when the weather strip is bent, the bending stress easily concentrates on the joined part between the first sealing body and the joint portion and on the joined part between the second sealing body and the joint portion. The above described weather strip suppresses formation of cracks at the joined parts in a favorable manner.

To achieve the foregoing objective, a weather strip joining die set is provided that includes a first die and a second die. The first die includes a first support hole for receiving and supporting one end of the first sealing body, a first protrusion, which protrudes to surround the first support hole, and a first recess, which is located between the first support hole and the first protrusion. The first recess extends along the first support hole to communicate with the first support hole. The second die includes a second support hole for receiving and supporting one end of the second sealing body, a second protrusion, which protrudes to surround the second support hole and form an mirror image of the first protrusion, and a second recess, which is located between the second support hole and the second protrusion and at a position facing the first recess. The second recess extends along the second support hole to communicate with the second support hole. The weather strip joining die set further includes a guide portion, which guides at least one of the first die and the second die such that a tip end of the first protrusion and a tip end of the second protrusion abut against each other over the entire circumference of the first support hole and the second support hole.

According to the above described joining die set, the joining sheet made of resin material is arranged between the first die, which supports an end of the first sealing body, and the second die, which supports an end of the second sealing body. Simultaneously, the guide portion guides the first sealing body, the second sealing body, and the joining sheet so that these are pressed against each other while being heated. This forms a weather strip that has the first sealing body and the second sealing body, which are joined and integrated by the joining portion made of resin material. During the pressing, some of the molten joining sheet flows into the first recess and the second recess to form the rib portion that bridges the outer surface of the first sealing body and the outer surface of the second sealing body.

In the above described weather strip joining die set, a width of each of the first recess and the second recess preferably decreases toward a bottom.

According to the above described joining die set, the thickness of the rib portion in the direction of bulging decreases as the distance from the opposed surfaces of the first and second sealing bodies increases.

To achieve the foregoing objective, a method for manufacturing a weather strip is provided that includes: arranging a joining sheet made of a resin material between a first sealing body and a second sealing body; heating and pressurizing the first sealing body and the second sealing body, thereby joining the sealing bodies with each other; and during the heating and pressurizing, forming a rib portion that bridges the first sealing body and the second sealing body by causing part of the molten joining sheet to flow around to an outer surface of an end of the first sealing body and to an outer surface of an 5 end of the second sealing body.

In accordance with the above describe manufacturing method, a weather strip is formed in which the first sealing body and the second sealing body are joined and integrated via the joint portion made of resin material. Further, at the heating and pressurizing in the formation of the weather strip, the rib portion, which bridges the outer surface of the first sealing body and the outer surface of the second sealing body, can be formed integrally with the joint portion.

DETAILED DESCRIPTION OF THE PREFERRED EMBODIMENTS

A weather strip 10, a weather strip joining die set 30, and weather strip manufacturing method according to one embodiment will now be described.

Figure 1:
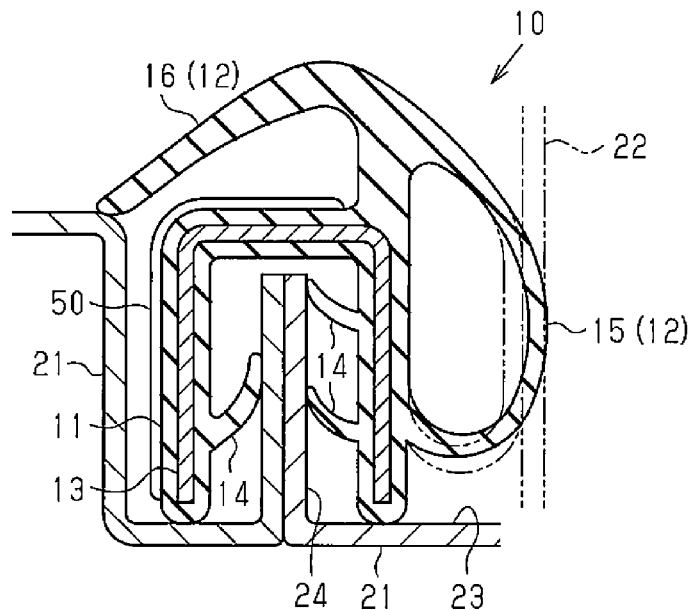
FIG. 1 is a cross-sectional view taken along line 1-1 in FIG. 2 and illustrating a weather strip according to one embodiment and the structure around the weather strip.

As shown in FIG. 1, the weather strip 10 includes a fixing portion 11, which is engaged with and fixed to a body panel 21, and a sealing portion 12, which contacts the body panel 21 and a door 22. In the present embodiment, the body panel 21 corresponds to a vehicle body, and the door 22 corresponds to a lid member.

The fixing portion 11 of the weather strip 10 has a substantially U-shaped cross-section and extends in a predetermined direction. The fixing portion 11 has a metal core member 13 therein. The core member 13 has a U-shaped cross-section and extends in the extending direction of the weather strip 10. The core member 13 ensures the strength of the weather strip 10, such that the weather strip 10 is prevented from deformed in an undesirable manner.

The body panel 21 has an opening 23 and a plate-like flange portion 24, which extends along the edge of the opening 23 and protrudes outward. The flange portion 24 is designed to enter the fixing portion 11 so that the fixing portion 11 is engaged with the flange portion 24. This fixes the weather strip 10 to the body panel 21.

The fixing portion 11 of the weather strip 10 has in it fixing lips 14, which protrude from the inner surface of the fixing portion 11 and is inclined in the direction of entry of the flange portion 24 (upward as viewed in FIG. 1). When the fixing portion 11 is fixed to the flange portion 24, the distal ends of the fixing lips 14 are pressed against the outer surfaces of the flange portion 24. The fixing lips 14 restrict the fixing portion 11 from being removed from the flange portion 24.

The sealing portion 12 of the weather strip 10 includes a hollow tube portion 15 having a substantially elliptic cross-section and a plate-like sealing lip portion 16.

The tube portion 15 is integrally formed with the fixing portion 11 on the side facing the outside of the vehicle (on the right side as viewed in FIG. 1) and extends in the extending direction of the weather strip 10. When the door 22 is closed, the tube portion 15 is pressed by the door 22 and compressed between the door 22 and the body panel 21 as indicated by the long dashed double-short dashed lines in FIG. 1. This causes the inner surface of the door 22 and the outer surface of the tube portion 15 to closely contact each other, so that the clearance between the door 22 and the weather strip 10, that is, the clearance between the door 22 and the body panel 21, is sealed.

The sealing lip portion 16 has a basal portion, which protrudes upward in the vehicle (upward as viewed in FIG. 1) from the tube portion 15, and a distal portion, which protrudes in a curved manner from the basal portion toward the center of the passenger compartment (leftward as viewed in FIG. 1) and downward in the vehicle. The distal portion of the sealing lip portion 16 contacts the body panel 21.

Figure 2:
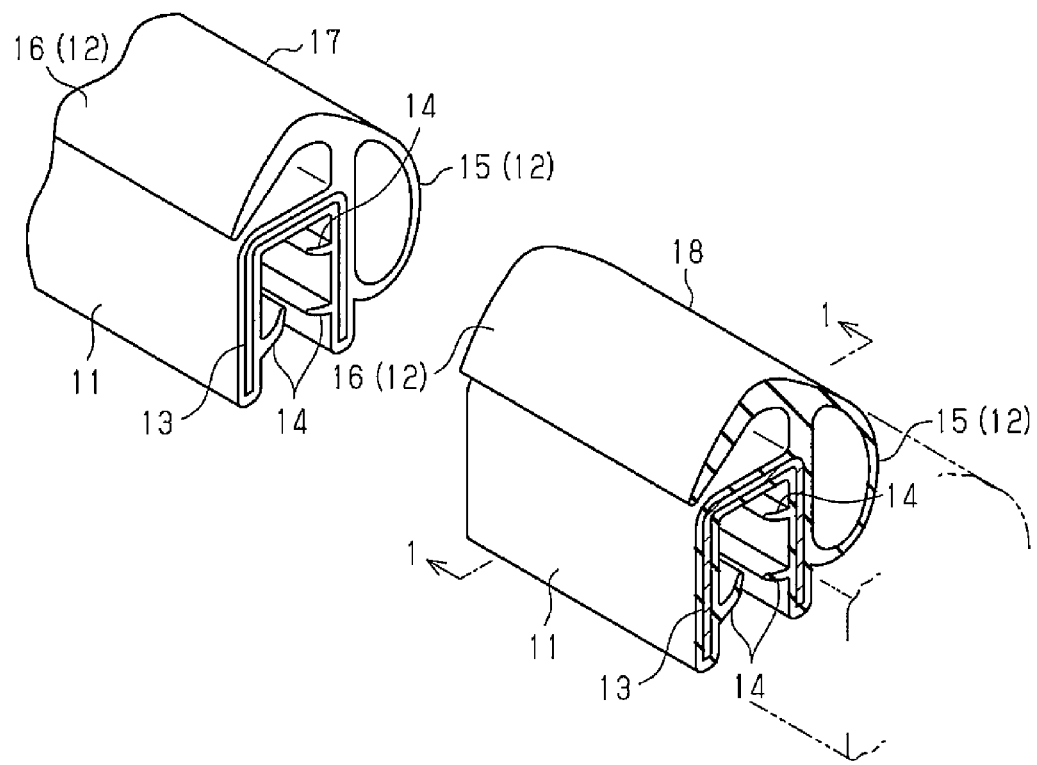
FIG. 2 is a perspective view showing a first sealing body and a second sealing body.

As shown in FIG. 2, the weather strip 10 has linearly extending two portions, that is, a first sealing body 17 and a second sealing body 18, which are joined to form an integral body. Specifically, a resin joint portion, which is made of, for example, a thermoplastic resin, is provided between the end face of the first sealing body 17 and the end face of the second sealing body 18. The resin joint portion joins the first sealing body 17 and the second sealing body 18 to each other. The first sealing body 17 and the second sealing body 18 are formed by extrusion in advance. The resin joint portion will be described below.

In the present embodiment, the first sealing body 17 and the second sealing body 18 are joined to each other in a joining die set 30. The structure of the joining die set 30 will now be described.

Figure 3:
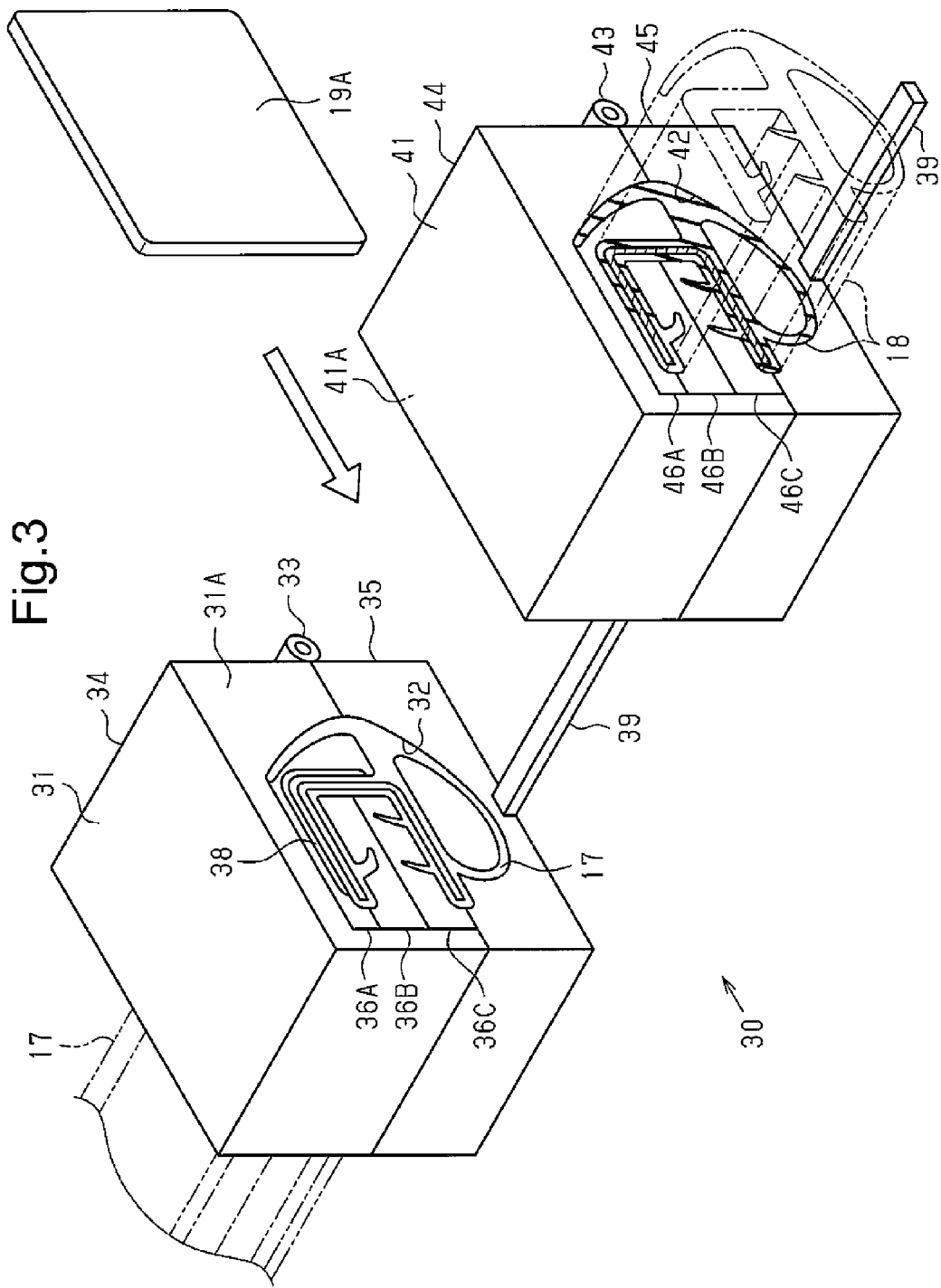
FIG. 3 is a perspective view showing weather strip joining die set.

As illustrated in FIG. 3, the joining die set 30 includes a first die 31, which supports the first sealing body 17, and a second die 41, which supports the second sealing body 18.

The first die 31 has a first support hole 32, which receives and supports one end of the first sealing body 17. The first support hole 32 has the cross-sectional shape corresponding to the cross-sectional shape of the weather strip 10 and extends linearly. The first die 31 includes an upper die block 34 and a lower die block 35, which are coupled to each other by a hinge 33. Three cores 36A, 36B, 36C are arranged between the upper die block 34 and the lower die block 35. The first support hole 32 is defined in the first die 31 by the upper die block 34, the lower die block 35, and the cores 36A, 36B, 36C.

The second die 41 has a second support hole 42, which receives and supports one end of the second sealing body 18. The second support hole 42 has the same cross-sectional shape as the cross-sectional shape of the weather strip 10 and extends linearly. The second die 41 includes an upper die block 44 and a lower die block 45, which are coupled to each other by a hinge 43. Three cores 46A, 46B, 46C are arranged between the upper die block 44 and the lower die block 45. The second support hole 42 is defined in the second die 41 by the upper die block 44, the lower die block 45, and the cores 46A, 46B, 46C.

Figure 4:
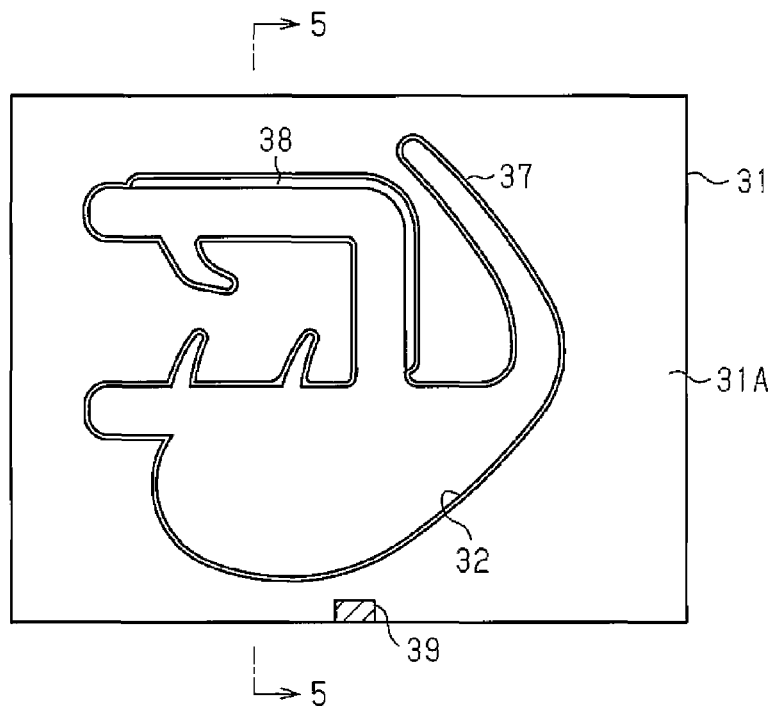
FIG. 4 is a side view showing the shape of a first protrusion of the first die.
Figures 5A, 5B:
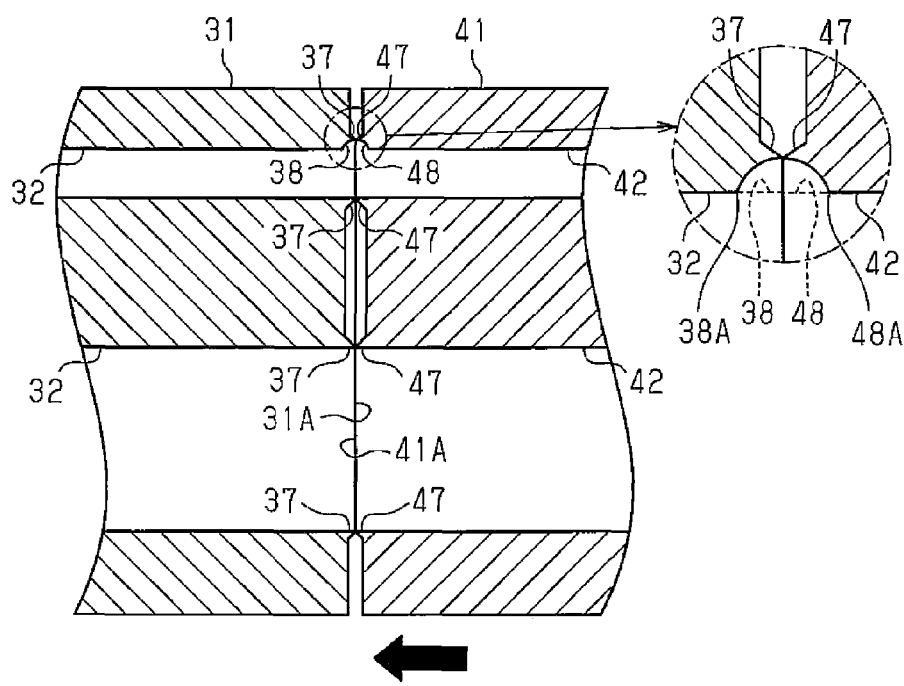
FIGS. 5A and 5B are cross-sectional views taken along line 5-5 in FIG. 4, illustrating the first die and the second die.

As shown in FIGS. 4, 5A, and 5B, a first protrusion 37, which protrudes to surround the first support hole 32, is formed on a die face 31A of the first die 31, which contacts the second die 41. The first protrusion 37 has a cross-sectional shape with a thickness decreasing toward the tip end. A first recess 38 is formed between the first support hole 32 and the first protrusion 37. The first recess 38 communicates with the first support hole 32 and extends along the first support hole 32. The inner surface of the first recess 38 is formed to be arcuate. The first recess 38 is also formed to have a width (the dimension in the up-down direction as viewed in FIG. 5A) that decreases toward a bottom 38A. The first recess 38 is formed in a part of the first die 31. Specifically, the first recess 38 is formed only in a part that corresponds to a part of the outer surface of the fixing portion 11 that is closer to the center of the passenger compartment (the upper side as viewed in FIG. 4) and a part that corresponds to the upper side of the vehicle (the right side as viewed in FIG. 4). For the illustrative purposes, the die faces of the upper die block 34, the lower die block 35, and the cores 36A, 36B, 36C are omitted in FIG. 4, and the first protrusion 37 and the first recess 38 are omitted in FIG. 3.

As shown in FIGS. 5A and 5B, a second protrusion 47, which protrudes to surround the second support hole 42, is formed on a die face 41A of the second die 41, which contacts the first die 31. The second protrusion 47 has a cross-sectional shape with a thickness decreasing toward the tip end. A second recess 48 is formed between the second support hole 42 and the second protrusion 47. The second recess 48 communicates with the second support hole 42 and extends along the second support hole 42. The inner surface of the second recess 48 is formed to be arcuate. The second recess 48 is also formed to have a width (the dimension in the up-down direction as viewed in FIG. 5A) that decreases toward a bottom 48A. The second recess 48 is formed in a part of the second die 41. Specifically, the second recess 48 is formed only in a part that corresponds to a part of the outer surface of the fixing portion 11 that is closer to the center of the passenger compartment and a part that corresponds to the upper side of the vehicle.

In the present embodiment, the first protrusion 37 of the first die 31 and the second protrusion 47 of the second die 41 are mirror images to each other. When the die face 31A of the first die 31 and the die face 41A of the second die 41 are mated, the tip end of the first protrusion 37 and the tip end of the second protrusion 47 contact each other over the entire circumference of the first support hole 32 and the second support hole 42. Also, when the die face 31A of the first die 31 and the die face 41A of the second die 41 mated, the first recess 38 of the first die 31 and the second recess 48 of the second die 41 are positioned to face each other.

As shown in FIG. 3, the joining die set 30 includes a guide rail 39, which guides the second die 41 toward the first die 31, such that the tip end of the first protrusion 37 of the first die 31 and the tip end of the second protrusion 47 of the second die 41 contact each other. Specifically, the first die 31 is fixed to one end of the guide rail 39, and the second die 41 is movable along the guide rail 39.

Next, a method for manufacturing the weather strip 10 using the joining die set 30 will be described.

First, as shown in FIG. 3, the cores 36A, 36B, 36C are attached to the first sealing body 17, which is formed in advance, so that the first sealing body 17 and core 36A, 36B, 36C are integrated. The integrated first sealing body 17 and cores 36A, 36B, 36C are set in the first die 31 by being held between the upper die block 34 and the lower die block 35. Accordingly, the first support hole 32 of the first die 31 receives and supports one end of the first sealing body 17.

The cores 46A, 46B, 46C are attached to the second sealing body 18, which is formed in advance, so that the second sealing body 18 and the cores 46A, 46B, 46C are integrated. The integrated second sealing body 18 and cores 46A, 46B, 46C are set in the second die 41 by being held between the upper die block 44 and the lower die block 45.

Accordingly, the second support hole 42 of the second die 41 receives and supports one end of the second sealing body 18.

Figures 6A, 6B:
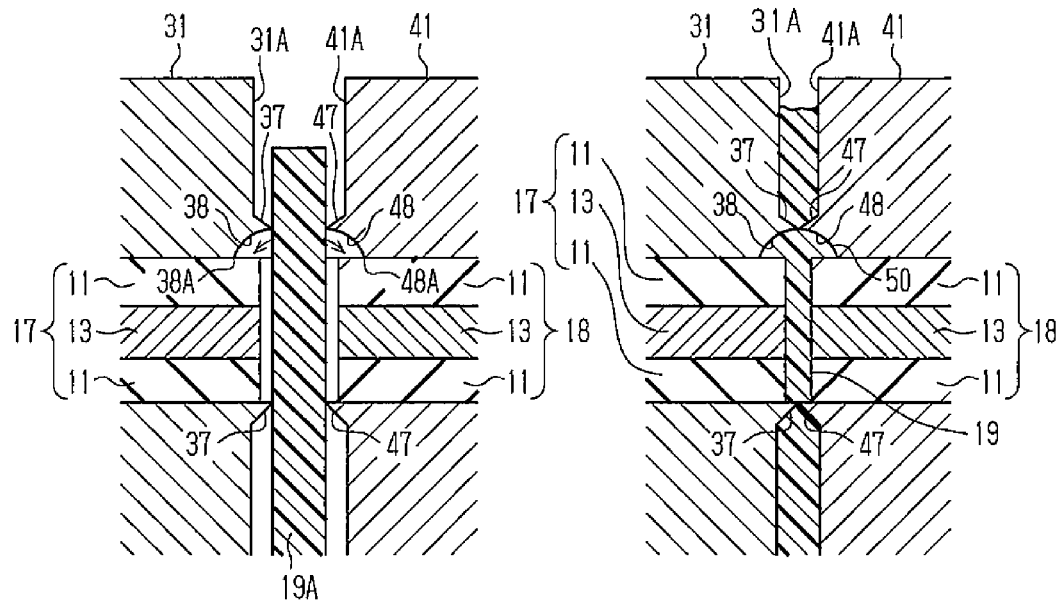
FIGS. 6A and 6B are cross-sectional views corresponding to FIG. 5A and FIG. 5B, showing a part including a first recess and a second recess in the joining die set, with reference to a method for manufacturing the weather strip.

Thereafter, a joining sheet 19A, which is made of a resin material such as an unvulcanized rubber or a thermoplastic elastomer, is placed between the first die 31 and the second die 41. Accordingly, the joining sheet 19A is arranged between the end face of the first sealing body 17 and the end face of the second sealing body 18. Next, as shown in FIG. 6A, the second die 41 is guided by the guide rail 39 to be abutted against the joining sheet 19A and the first die 31. Further, the second die 41 is pressed against the joining sheet 19A, and the joining die set 30 is heated. Accordingly, the first sealing body 17, the second sealing body 18, and the joining sheet 19A are pressurized while being heated and closely contact each other between the first die 31 and the second die 41.

At this time, as shown in FIG. 6B, the joining sheet 19A is melted and the molten resin fills the space defined by the end face of the first sealing body 17, the first protrusion 37 of the first die 31, the end face of the second sealing body 18, and the second protrusion 47 of the second die 41. This forms the resin joint portion 19 between the first sealing body 17 and the second sealing body 18, and the first sealing body 17 and the second sealing body 18 are joined to form an integral body by the resin joint portion 19. The excess of the molten joining sheet 19A is pressed and cut off when the first protrusion 37 and the second protrusion 47 are abutted against each other.

As indicated by arrows in FIG. 6A, part of the joining sheet 19A that has been melted during the joining process flows into the first recess 38 of the first die 31 and the second recess 48 of the second die 41 and around to the outer surface of the ends of the first sealing body 17 and the second sealing body 18. Thus, as shown in FIG. 6B, a rib portion 50 is formed that extends to bridge the outer surface of the first sealing body 17 and the outer surface of the second sealing body 18.

Thereafter, with the cores 36A, 36B, 36C, 46A, 46B, 46C attached, the weather strip 10 is removed from the first die 31 and the second die 41. The cores 36A to 36C and 46A to 46C are then removed so that the weather strip 10 is completed.

The rib portion 50, which is formed through the above described manufacturing process, will now be described.

Figure 7:
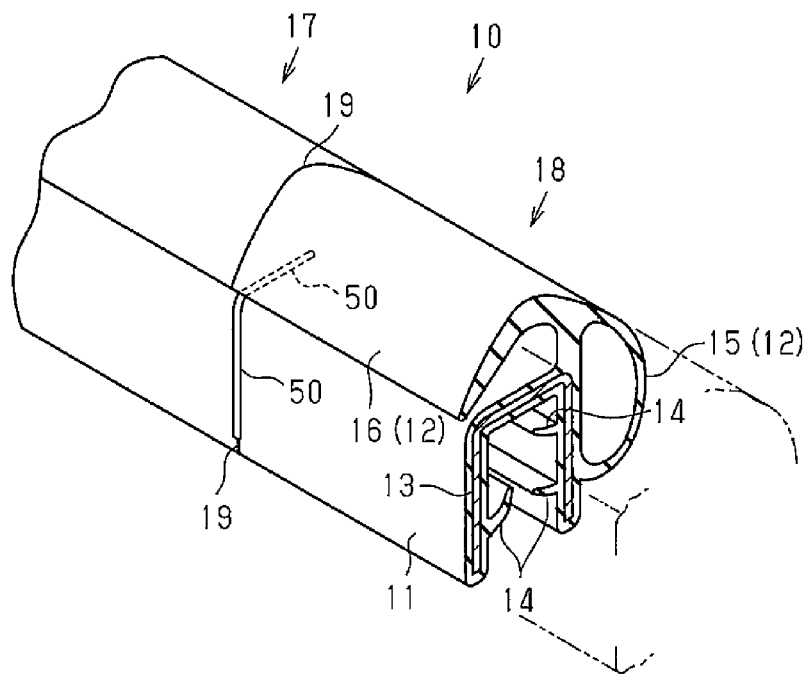
FIG. 7 is a perspective view showing a rib portion and the part surrounding the rib portion in the weather strip.
Figure 8:
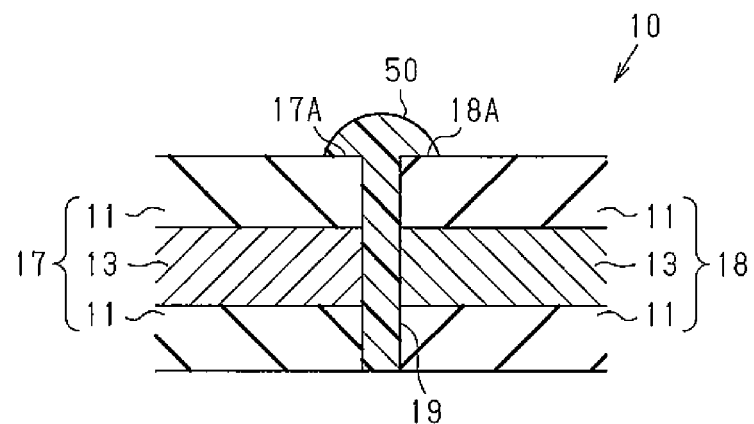
FIG. 8 is a cross-sectional view corresponding to FIG. 6B showing the rib portion and the part surrounding the rib portion in the weather strip.

As shown in FIGS. 7 and 8, the rib portion 50 is formed integrally with the resin joint portion 19 to bulge outward from between the opposed surfaces of the first sealing body 17 and the second sealing body 18. The rib portion 50 is joined to the outer surface of the end of the first sealing body 17 (a joined part 17A) and the outer surface of the end of the second sealing body 18 (a joined part 18A) and extends along the joined part between the first sealing body 17 and the second sealing body 18, that is, along the resin joint portion 19. The thickness of the rib portion 50 in the bulging direction decreases as the distance from the opposed end faces of the first sealing body 17 and the second sealing body 18 increases. The rib portion 50 is formed only on a part of the outer surface of the fixing portion 11 of the weather strip 10. Specifically, the rib portion 50 is formed only in a part that corresponds to a part of the outer surface of the fixing portion 11 that is closer to the center of the passenger compartment (the left side as viewed in FIG. 7) and a part that corresponds to the upper side of the vehicle (the upper side as viewed in FIG. 7). Thus, as obvious from FIGS. 1 and 7, the rib portion 50 is located at a position surrounded by the body panel 21, the fixing portion 11, and the sealing lip portion 16.

The present embodiment achieves the following advantages.

(1) The rib portion 50, which is integrated with the resin joint portion 19, is joined to the outer surface of the first sealing body 17 and the outer surface of the second sealing body 18. Thus, compared to a weather strip without a rib portion 50, the area of joint between the sealing bodies 17, 18 and the resin joint portion 19 is increased by the amount corresponding to the joined part 17A between the outer surface of the first sealing body 17 and the rib portion 50 and the joined part 18A between the outer surface of the second sealing body 18 and the rib portion 50.

Further, the joined parts 17A, 18A extend along the outer surfaces of the first sealing body 17 and the outer surface of the second sealing body 18. Therefore, when the weather strip 10 is bent such that a portion on one side of the axis of the weather strip 10 is expanded, and the portion on the other side is compressed, the expanded portion is allowed to expand along the joined parts 17A, 18A. When the weather strip 10 is bent, if the expanded portion is expanded in a direction perpendicular to the joined parts 17A, 18A, most of the bending stress acts to tear the joined parts 17A, 18A. In contrast, in the case of the above described weather strip 10, since the portion that is expanded when bent is expanded in a direction along the joined parts 17A, 18A, the part of the bending stress that acts in a direction tearing the joined parts 17A, 18A is reduced. Therefore, the weather strip 10 has a structure that is unlikely to form cracks due to bending stress.

Thus, according to the above described weather strip 10, the rib portion 50 reinforces the joined parts of the first and second sealing bodies 17, 18. Therefore, if bending stress acts on the joined parts of the first and second sealing bodies 17, 18 when the weather strip 10 is bent, formation of cracks in the joined parts is suppressed in a favorable manner.

(2) The thickness of the rib portion 50 in the bulging direction decreases as the distance from the opposed end faces of the first sealing body 17 and the second sealing body 18 increases. This allows the ends of the rib portion 50 to be easily expanded or compressed when the weather strip 10 is bent. This reduces the stress acting on the joined part between the rib portion 50 and the first sealing body 17 and the stress acting on the joined part between the rib portion 50 and the second sealing body 18, so that formation of cracks at these joined parts is suppressed in a favorable manner.

(3) Since the rib portion 50 is formed only on the fixing portion 11 of the weather strip 10, the rib portion 50 suppresses formation of cracks in the joined parts of the first sealing body 17 and the second sealing body 18. Further, since the rib portion 50 is not formed in the sealing portion 12 of the weather strip 10, the sealing performance of the sealing portion 12 is not lowered by the rib portion 50.

(4) The rib portion 50 is located at a position surrounded by the body panel 21, the fixing portion 11, and the sealing lip portion 16. In other words, the rib portion 50 is located at a position that cannot be seen by the occupants of the vehicle, the rib portion 50 therefore does not degrade the appearance.

(5) The core member 13 is provided in each of the first sealing body 17 and the second sealing body 18 to extend in the extending direction of the sealing bodies 17, 18. In the above described weather strip 10, the first sealing body 17 and the second sealing body 18, each of which has a core member 13, resist bending. However, the resin joint portion 19, at which no core member 13 exists, is easily bent. Therefore, it can be said that the above described weather strip 10 has a structure in which bending stress easily concentrates on the joined part between the first sealing body 17 and the resin joint portion 19 and on the joined part between the second sealing body 18 and the resin joint portion 19 when the weather strip 10 is bent. Since the rib portion 50 is formed at such joined parts, formation of cracks at these joined parts is suppressed in a favorable manner.

(6) During the manufacturing process using the joining die set 30, the joining sheet 19A is arranged between the first die 31, which supports one end of the first sealing body 17, and the second die 41, which supports one end of the second sealing body 18. At the same time, through the guidance of the guide rail 39, the first sealing body 17, the second sealing body 18, and the joining sheet 19A are pressurized while being heated and are caused to closely contact each other. Accordingly, the weather strip 10 is formed, in which the first sealing body 17 and the second sealing body 18 are joined and integrated via the resin joint portion 19. Also, in the joining die set 30, the part of the joining sheet 19A that has been melted during the pressurizing and joining process flows into the first recess 38 of the first die 31 and the second recess 48 of the second die 41. This forms a rib portion 50 that extends to bridge the outer surface of the first sealing body 17 and the outer surface of the second sealing body 18.

(7) The first recess 38 of the first die 31 and the second recess 48 of the second die 41 are each formed to have a width that decreases toward the bottom 38A, 48A. Therefore, the thickness of the rib portion 50 in the direction of bulging decreases as the distance from the opposed faces of the first and second sealing bodies 17, 18 increases.

The above illustrated embodiment may be modified as follows.

The rib portion 50 of the weather strip 10 may be located at a position that can be seen by the occupant of the vehicle.

The rib portion 50 of the weather strip 10 may be formed on the sealing portion 12 in addition to the fixing portion 11. In this case, the rib portion can be formed at any position on the sealing portion 12 as long as it does not contact the body panel 21 or the door 22.

The thickness of the rib portion 50 in the bulging direction may be changed as necessary. Specifically, the thickness may be constant or increase as the distance from the opposed surfaces of the first sealing body 17 and the second sealing body 18 increases.

The width of each part of the first recess 38 and the second recess 48 may be changed as necessary. Specifically, the width may be constant or increase toward the bottom 38A of the first recess 38 (or the bottom 48A of the second recess 48).

Figure 9:
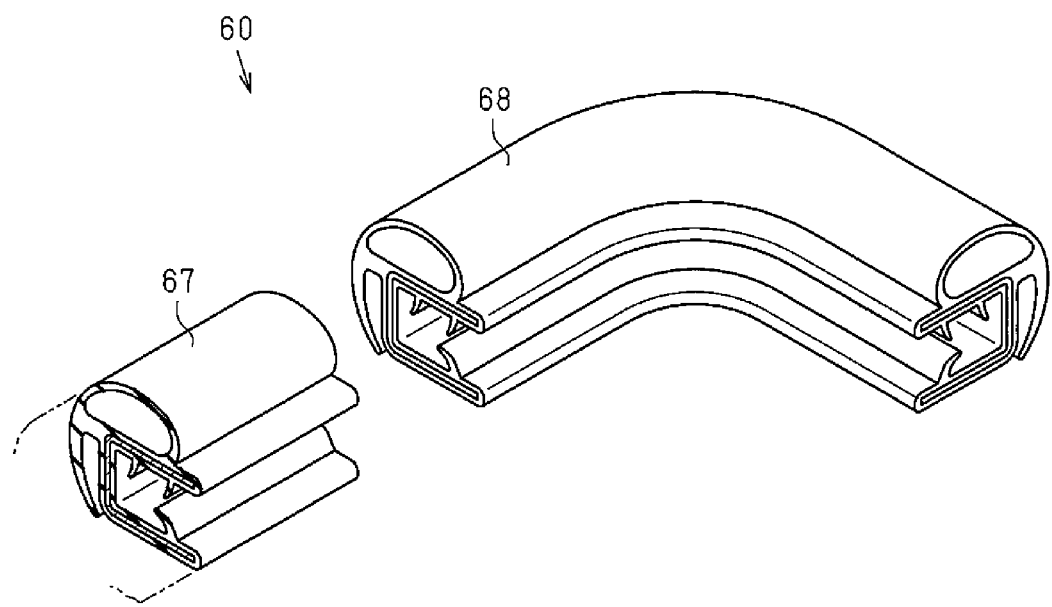
FIG. 9 is a perspective view illustrating two sealing bodies in a weather strip according to another embodiment.

The weather strip, the weather strip joining die set, and the weather strip manufacturing method of the above described embodiment can be applied to a weather strip 60 illustrated in FIG. 9, which is formed by joining a linearly extending sealing body 67 and sealing body 68 the extending direction of which is changed sharply.

The invention claimed is:

1. A weather strip comprising:
   a first sealing body;
   a second sealing body; and
   a joint portion that is located between the first and second sealing bodies and made of a resin material for joining the first and second sealing bodies with each other, wherein
   the joint portion includes a rib portion,
   the rib portion bulges outward from between the first sealing body and the second sealing body,
   the rib portion is joined to an outer surface of an end of the first sealing body and to an outer surface of an end of the second sealing body,
   a thickness of the rib portion in a direction of bulging decreases as a distance from the joint portion increases, and
   the rib portion extends to bridge the outer surface of the first sealing body and the outer surface of the second sealing body.

2. The weather strip according to claim 1, wherein
   the weather strip is arranged between an opening of a vehicle body and a lid member that is attached to the vehicle body to selectively open and closes the opening,
   the weather strip includes a fixing portion to be fixed to the vehicle body and a sealing portion, which seals a clearance between the lid member and the vehicle body when the lid member closes the opening, and
   the rib portion is provided on the fixing portion.

3. The weather strip according to claim 2, further comprising a plate-shaped sealing lip portion, which has a tip end contacting the vehicle body,
   wherein the rib portion is located at a position surrounded by the vehicle body, the fixing portion, and the sealing lip portion.

4. The weather strip according to claim 1, wherein each of the first sealing body and the second sealing body has in it a core member that extends in an extending direction.

5. The weather strip according to claim 1,
   wherein the first sealing body and the second sealing body, which the rib portion bridges, are separate sealing bodies.

6. The weather strip according to claim 1,
   wherein the first and second sealing bodies are joined with each other in a direction perpendicular to a linear axis of the first and second sealing bodies.

7. The weather strip according to claim 1,
   wherein the rib portion further bridges over an outermost circumference of the outer surface of the first sealing body and an outermost circumference of the outer surface of the second sealing body.

* * * * *